United States Patent Office 3,513,211
Patented May 19, 1970

3,513,211
PROCESS FOR HYDROGENATION OF
AROMATIC HYDROCARBONS
Lowell D. Grinninger, Cincinnati, Ohio, assignor to National Distillers and Chemical Corporation, New York, N.Y., a corporation of Virginia
No Drawing. Filed Aug. 18, 1967, Ser. No. 661,720
Int. Cl. C07c 5/10; C08d 3/04; C08f 3/16
U.S. Cl. 260—667                                    7 Claims

ABSTRACT OF THE DISCLOSURE

A process is provided for the hydrogenation of aromatic hydrocarbons having a benzene nucleus in liquid ammonia, using metallic sodium and lower aliphatic alcohol as the source of hydrogen, employing sodium in an average particle size within the range from about 0.5 to about 50 microns, dispersed in an inert diluent.

The product is useful as a molecular weight moderator in alfin polymerization, and a process for preparing alfin polymers is also provided employing the reaction product for this purpose.

---

This invention relates to a process for the hydrogenation of benzene, diphenyl and other benzene derivatives, and more particularly to the hydrogenation of aromatic compounds containing a benzene nucleus by the use of a dispersion of finely-divided sodium in liquid ammonia, with an aliphatic alcohol as the course of hydrogen. Any benzene derivative stable under these reaction conditions can be hydrogenated by this process. In addition, a process for preparing alfin polymers is provided, employing the above hydrogenated aromatic compounds as molecular weight moderators.

Morton and coworkers in a series of papers in the Journal of the American Chemical Society, starting in 1947, describe an organo alkali metal catalyst for the polymerization of olefins and particularly dienes, which they termed an alfin catalyst, Journal of the American Chemical Society, 69, 161, 167, 950, 1675, 2224 (1947). The name "alfin" was taken from the use of an alcohol and an olefin in their preparation. The alcohol, a methyl n-alkyl carbinol in the form of the sodium salt, and the olefin, also in the form of a sodium salt, form a complex that with sodium chloride formed in situ constitutes the catalyst.

These catalysts were reported by Morton et al. to cause the polymerization of butadiene, isoprene, and other dienes, alone and together with other copolymerizable organic compounds, in most cases diolefinic in nature. The catalyst was discovered in the course of a study of the addition of organo sodium compounds to dienes. Later on, Morton summarized the work done up until 1950 in Industrial and Engineering Chemistry, 42, 1488–1496 (1950).

The polymers obtained using alfin catalysts are termed alfin polymers or alfin rubbers. Because of the speed and ease of the polymerization reaction, these attracted considerable interest in the 1940's and early 1950's. However, the very speed of the reaction led to problems. The alfin rubbers as initially prepared have the disadvantage of having an extremely high molecular weight, having dilute solution viscosities in toluene of 10 to 15. As a result, although the polymers are generally gel-free and have high tensile strength, superior abrasion resistance, and tear strength, they are also very tough, and exhibit little breakdown and poor banding on the mill. Therefore, they are difficult if not impossible to process using conventional equipment.

Greenberg et al. U.S. Pat. Nos. 3,067,187, granted Dec. 4, 1962, and 3,223,691, granted Dec. 14, 1965, showed how the molecular weight of the alfin rubbers or polymers could be controlled within a prescribed range of from about 50,000 to about 1,250,000, so that they could be processed using conventional equipment. Greenberg et al. controlled the molecular weight of the polymer by incorporation of a molecular weight moderator, a dihydroaromatic compound, such as dihydrobenzene or dihydronaphthalene, during the polymerization reaction. As a consequence, the interest in the alfin rubbers has been renewed, and they are now finding commercial application. In view of this, there has been a considerable interest in the preparation of dihydroaromatic compounds for use in this polymerization reaction.

In accordance with the instant invention, a process is provided for preparing aromatic dihydrobenzenes by partial reduction of the corresponding benzene or benzene derivative in liquid ammonia with a dispersion of sodium, using an aliphatic alcohol as the source of hydrogen. In the process of this invention, a finely-divided sodium dispersion is employed. An effective reduction is obtained when the sodium has a maximum average particle size within the range from about 0.5 to about 50 microns. The preferred average size is less than 10 microns.

The use of finely-divided sodium ensures that the sodium can be rapidly dissolved in the liquid ammonia solvent. If sodium particles larger than 50 microns are employed, the sodium may tend to agglomerate or form balls of sodium prior to addition to the liquid ammonia. These agglomerates or balls of sodium are difficult to handle and are undesirable.

The use of sodium in the form of small particles (dispersion) as defined hereinbefore gives excellent control of the sodium dissolution in the liquid ammonia. When sodium is added to liquid ammonia, heat is liberated. If large pieces of sodium are added to the liquid ammonia, an excessive amount of heat may be liberated which can be difficult to control. Rapid liberation of heat can lead to an explosion.

After removal of the sodium alkoxide, water and any excess alcohol, the aromatic dihydrobenzene-containing reaction mixture formed by the process of the instant invention can be employed directly as a molecular weight moderator or control agent with alfin catalysts in the alfin rubber processs, without the need for separating, purifying, or concentrating the aromatic dihydrobenzene from the solvent or inert diluent for the sodium in the reaction mixture. It is therefore preferred to employ a solvent or inert diluent for the sodium in forming the sodium dispersion which is also suitable for use as a solvent for the alfin catalyst in the alfin rubber process. In this case it is desirable that the alcohol employed as the source of hydrogen in the above process also be suitable for usein the alfin rubber process. If the solvent or inert diluent for the sodium and/or the alcohol cannot be employed in the alfin rubber process, these materials including water can be removed from the aromatic dihydrobenzene by conventional means, such as by distillation.

Thus, in addition, in accordance with the instant invention, an improvement in the manufacture of alfin rubbers or polymers is provided, which comprises polymerizing an unsaturated organic compound in the presence of an alfin catalyst and the impure aromatic dihydrobenzene solvent-containing reaction product prepared by reduction of the corresponding benzene or benzene derivative in accordance with the invention, afer removal of sodium alkoxide, water and excess alcohol.

In order that the solvent-containing aromatic dihydrobenzene can be employed without further purification in the alfin rubber process, the concentration of dihydrobenzene should be within a range from about 1 to about 20% by weight and preferably in an amount within the range from about 1 to about 10% by weight. Concentration can be adjusted by removal of or addition of solvent.

The process of the invention is applicable to any aromatic hydrocarbon having a benzene nucleus.

Such hydrocarbons are defined by the formula:

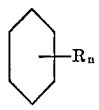

where $n$ is an integer from zero to 6 and R is alkyl, aryl, alkoxy, alkylaryl, arylalkyl, cycloalkyl, alkyl cycloalkyl, cycloalkyl alkyl, cycloalkyl aryl and aryl cycloalkyl, having from one to about fifty carbon atoms, such as methyl, ethyl, propyl, isopropyl, butyl, isobutyl, tert-butyl, sec-butyl, amyl, isoamyl, octyl, isooctyl, nonyl, dodecyl, behenyl, stearyl, benzyl, phenyl, xylyl, tolyl, phenylphenyl, terphenyl, naphthyl phenyl, cyclohexyl, cyclopentyl, cycloheptyl, methylcyclohexyl, phenyl cyclohexyl, methoxy and ethoxy.

Exemplary, in addition to benzene, are alkoxy-substituted benzenes such an anisole and phenetole, alkyl-substituted benzenes such as toluene, p-xylene, o-xylene, ethyl benzene, p-diethyl benzene, m-diethyl benzene, tertiary-butyl benzene, mesitylene, hexamethyl benzene and tetraethyl benzene and phenyl benzenes such as diphenyl and terphenyl. Any substituents on the benzene nucleus should be stable during the reduction reaction.

Any lower aliphatic alcohol can be employed as a source of hydrogen in the process of the invention. Sodium reacts with the hydroxyl group of the alcohol, forming the sodium alkoxide, and hydrogen is liberated as the reactant. Exemplary aliphatic monohydric alcohols include methanol, ethanol, propanol, isopropanol, butanol, tertiary butanol, sec-butanol, isobutanol, pentanol, isopentanol, secondary pentanol, hexanol and isohexanol. Isopropanol of use in the alfin rubber process, and methanol both give excellent results, and are readily available, and therefore are usually preferred.

It is usually advantageous to use as the aliphatic alcohol the same alcohol, i.e., a secondary or methyl n-alkyl carbinol, that is employed in the preparation of the alfin catalyst used in the alfin polymerization with the dihydrobenzene produced as the reaction product of the process, this usually being isopropanol. In this event, the crude dihydrobenzene can be used directly in an alfin rubber process, after removal of the sodium alkoxide.

The sodium is put in finely-divided form by grinding or milling in the presence of an inert diluent and dispersing aid. Any conventional milling or homogenizing equipment can be employed. Because of the dangers in handling sodium, it is necessary that the equipment be fitted with means for carrying out the milling or grinding under an inert atmosphere, such as nitrogen, argon or helium. A particularly effective sodium dispersion can be prepared using a Manton Gaulin mill, which is capable of reducing sodium to an average particle size of from about 1 to 2 microns in a reasonable time cycle.

The amount of sodium in the dispersion is not critical, and can be adjusted to suit any reduction reaction. Usually, a sodium concentration within the range from about 10 to about 50% is satisfactory, and 25% is preferred.

The inert diluent that is employed for dispersion of the sodium can be any liquid aliphatic or cycloaliphatic saturated hydrocarbon, especially those suitable for the alfin rubber process. The hydrocarbon should be a liquid under the conditions during which the reduction is carried out at temperatures as low as −80° C. In addition, if the partially hydrogenated benzene is used in an alfin polymerization, it should remain liquid at temperatures as high as 100° C., the maximum temperature normally reached during alfin catalyst formation.

The satisfactory aliphatic hydrocarbon solvents include pentane, hexane, heptane, octane, nonane and decane, isooctane and branched chain aliphatic hydrocarbons, as well as commercially available solvent mixtures including any of these hydrocarbons, such as Isopar C, a mixture of isoparaffins containing 70 to 80% 2,2,4-trimethylpentane and homologues thereof. Sinclair Light Alkylate, having the typical composition:

| Component— | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.6 |
| | 100.0 | and Isopar E, which typically has the composition:

| Composition— | Weight percent |
|---|---|
| 2,2,4-trimethylpentane | 2.2 |
| 2,5-dimethylhexane } 2,4-dimethylhexane | 4.8 |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane } 3,4-dimethylheptane } 2,3-dimethylheptane } 3,3,4-trimethylhexane | 5.7 |
| 15 other iso-components | 13.7 |
| $C_9$ naphtha+$C_{10+}$ | 1.8 |
| | 100.0 |

Also useful are cycloaliphatic hydrocarbons, such as cyclohexane, cyclopentane, methyl cyclohexane, and cycloheptane, etc.

It is usually preferable to run the diluent into the mixing apparatus, such as the Gaulin mill. Sodium metal is then added together with a suitable dispersing aid, such as aluminum distearate. The system must be placed under an inert gas, such as nitrogen, argon or helium, during the dispersion. The diluent is brought to a temperature at which the metallic sodium liquefies, and milling is then begun, to reduce the molten sodium to a small particle size. The finished dispersion is then stored under nitrogen or other inert gas to preserve its activity. When prepared properly, the dispersion is stable for two weeks or more.

It will, of course, the apparent that any milling or homogenizing equipment can be used in dispersion of the sodium in the inert diluent. It is generally preferred that the equipment be capable of dispersing the sodium in the diluent to an average particle size within the range from about 0.5 to about 50 microns. The temperature employed during the dispersion must be above the melting point of sodium, and, because sodium melts at 97.6° C., temperatures within the range of from about 100 to about 120° C. are suitable. It is preferred to work at a temperature above 110° C. Excessively high temperatures are not desirable, because of the danger involved in handling sodium at high temperatures in the presence of hydrocarbon solvents.

The inert diluent employed in the preparation of such sodium dispersions is completely miscible with the reaction system employed in the present invention, composed of liquid ammonia and the benzene starting material. During the reduction reaction the solvent should be able to act as an "antifreeze" for the benzene (freezing point 5.5° C.) allowing for more ready reduction of liquid rather than solid aromatic hydrocarbon. In the isolation step the solvent serves as a heat conduction agent when distilling off ammonia and picks up the dihydrobenzene reaction product which can be processed to yield an alkali- and alcohol-free dilute moderator solution for the alfin process.

In carrying out the hydrogenation of the invention, the liquid ammonia is put into a reactor, and the finely-divided sodium dispersion is then added. Next, the benzene reactant is combined with this mixture, and finally, the aliphatic alcohol employed as the source of hydrogen is added slowly, so as to keep the reaction under control, inasmuch as the addition may be accompanied by a violent liberation of hydrogen, if it is too rapid, and an excessive liberation of heat and a corresponding loss of yield of desired product.

It is usually convenient to permit the reaction to proceed at the reflux temperature ($-33°$ C. at atmospheric pressure) of liquid ammonia, which facilitates control of the reaction. A convenient range of reaction temperatures is from about $-80°$ to about $-33°$ C. Suitable pressure reactors can be used, if it is desired to use higher temperatures.

Upon completion of the reaction, additional alcohol can be added so as to eliminate any excess residual sodium. The liquid ammonia solvent is distilled off, and water is added to the reaction mixture to hydrolyze the sodium alkoxide, forming sodium hydroxide and regenerating the alcohol. It is important to separate the alkaline aqueous layer from the organic layer which contains the dihydrobenzene as rapidly as possible, in order to avoid isomerization of 1,4-dihydro isomer, the desired product, to 1,2-dihydro isomer.

In the water quench step or initial water wash, water is added slowly to the reaction mixture to decompose the alkoxide to sodium hydroxide and the alcohol. When this decomposition is complete, a large volume of additional water is added and the mixture is agitated from, for example, 1 to 5 minutes. This mixture is allowed to settle, resulting in the formation of an aqueous layer containing the bulk of the sodium hydroxide, and this layer is then separated.

The subsequent water washes after the removal of the initial aqueous layer containing the bulk of the sodium hydroxide are important in ensuring the removal of residual sodium hydroxide and alcohol and thereby reduce the possibility of the formation of larger amounts of the 1,2-dihydro aromatic hydrocarbon. After the quench and washing steps, the product can be concentrated and trace amounts of water and alcohol removed by distilling from about $\frac{1}{5}$ to about $\frac{1}{4}$ of the initial solvent charge. Final drying can be accomplished over a desiccant or by passing the dihydro aromatic hydrocarbon solution through a suitable molecular sieve.

As indicated hereinbefore, the dihydro aromatic hydrocarbon produced herein can be used in the preparation of alfin rubbers employing an alfin catalyst. The alfin catalyst can comprise a sodium alkoxide, a sodium alkenyl compound and an alkali metal salt, such as, for example, a mixture of sodium isopropoxide, allyl sodium, and sodium chloride. The catalyst is usually prepared by reacting amyl chloride with sodium, and subsequently reacting this product with a methyl carbinol and an olefin. In an illustrative example, the alfin catalyst is prepared by reacting two moles of amyl chloride and four equivalents of sodium in pentane or hexane, with high speed stirring. One mole of the resulting amyl sodium is then reacted with one mole of isopropyl alcohol, and one mole of the amyl sodium is reacted with one mole of propylene to give a mixture containing sodium isopropoxide, allyl sodium, and sodium chloride. These steps are effected at about $-15°$ C. in order to prevent side reactions.

Typical preparations of an alfin catalyst for use in the alfin rubber process employing amyl chloride are described in sufficient detail in the Greenberg et al. Pat. Nos. 3,067,187 and 3,223,691 and in the Morton articles supra, so that full details of these procedures are not required here.

An alfin catalyst of satisfactory activity can also be obtained by inverting the order of reaction of the components, and substituting n-butyl chloride for n-amyl chloride. In this method, sodium isopropoxide is formed by direct reaction with sodium, instead of with alkyl sodium, with a saving of one-half of the alkyl halide and one-quarter of the sodium. Such a catalyst can be prepared at ambient temperatures, up to and including the boiling point of the hydrocarbon solvent. This precedure is described in U.S. Pat. No. 3,317,437, issued May 2, 1967, to Hoffman et al.

As the alcohol component, used to form the sodium alkoxide in the alfin catalyst, any methyl n-alkyl carbinol having from one to about ten carbon atoms can be used, such as isopropanol, methyl-n-propyl carbinol, and methyl-n-butyl carbinol. Isopropanol is preferred.

The alkoxide will form at rather low temperatures, as low as $-20°$ C. being satisfactory. There is no upper limit on reaction temperature.

The olefin has from about three to about ten carbon atoms, and should contain the group $-CH=CH-CH_2$. Propylene is preferred, giving allyl sodium, but butene-1, pentene-1, hexene-1, etc. can also be used. Terminal olefins $CH_2=CH-CH_2-$ are preferred. Activity may decrease as the olefin molecular weight increases.

The alkenyl sodium, sodium alkoxide and sodium composing the alfin catalyst are prepared by reaction of a sodium dispersion with the alcohol and the olefin in the presence of the dispersing liquid used for the catalyst. This can be and preferably is the same as the inert diluent used for the sodium dispersion in preparing the alfin catalyst and the dihydrobenzene molecular weight modifier. Frequently, however, a lower-boiling hydrocarbon such as hexane is used, to facilitate separation later. Any inert aliphatic or cycloaliphatic hydrocarbon is satisfactory.

The olefin is metallated by use of an alkyl sodium, the organic portion having from about three to about ten carbon atoms. Butyl chloride is preferred, but propyl chloride, amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about $-20°$ to about $+80°$ C. can be employed. From one to about five hours' reaction time is normally adequate.

The reaction mixture can be prepared by mixing the catalyst diluent, sodium dispersion including aluminum distearate, if desired, and alkyl halide, and then adding the alcohol. After the alkoxide has been formed, the olefin is added, and metallated. Excess olefin is removed, and the residue can be used as the alfin catalyst, without further treatment or purification. In this method, the sodium is first converted to the alkyl sodium, and half this is then converted to the alkoxide, while the remainder is converted to alkenyl sodium.

It is also possible to add the alcohol to the sodium dispersion mixed with the catalyst diluent, forming the sodium alkoxide, and then adding the alkyl halide, and, finally, the olefin. This procedure requires half the amount of alkyl halide, and two-thirds the amount of sodium, required by the first procedure, and is therefore preferred in a commercial operation.

Such alfin catalysts can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes p-methoxy-styrene, alpha-methyl-styrene, vinyl naphthalene, and other unsaturated hydrocarbons. 1,3-butadiene alone and combinations of butadiene and styrene or isoprene are preferred polymerizable unsaturated compounds, and the polymerization of these is particularly enhanced by the aluminum distearate-containing alfin catalysts prepared in accordance with this invention.

The amount of alfin catalyst (solids basis) that is employed for the alfin polymerization is normally from about 1 to about 5 weight percent, and preferably from about 1 to about 3.5 weight percent, based on the weight of the unsaturated organic compound.

The alfin polymerization reaction generally takes place at atmospheric pressure and room temperature in a suitable reaction medium. The pressure and temperature conditions are not critical for polymerization, however, and the reaction will take place at any pressure within the range from about 1 to about 50 atmospheres and at any temperature within the range from about $-25$ to about $+100°$ C.

Preferred reaction media are inert aliphatic and cycloaliphatic hydrocarbons, such as pentane, hexane, 1:1 mixture of hexane and pentane, octane, cyclohexane, cyclopentane, cycloheptane, Decalin, and heptane. A preferred reaction solvent is the hydrocarbon employed for the dispersion of sodium in the preparation of the alfin catalyst and the dihydrobenzene molecular weight moderator.

Where the same solvent or diluent is employed in the dispersion of sodium used in the preparation of the dihydroaromatic compound, in the dispersion of sodium used in the preparation of the alfin catalyst, and as the reaction medium in the preparation of alfin polymers, a continuous operation is facilitated, since it is unnecessary to separate solvent mixtures, and the solvent or diluent separated from the alfin polymer can be recycled for reuse in any or all of the above-mentioned preparations.

It is quite important that water be excluded from the alfin polymerization reaction mixture, and consequently it is essential that all components that eventually will be employed therein, including the solvent employed in the dispersion of the sodium, be anhydrous.

The polymerization reaction can be conducted in a batch-wise, semi-continuous, or continuous manner, and the polymers and copolymers obtained as reaction products can be recovered by any conventional technique.

The following examples in the opinion of the inventor represent preferred embodiments of his invention.

EXAMPLES 1 to 6

An apparatus was set up composed of two three-necked round bottom flasks, each of three liters capacity. One end neck of each flask was linked to the other with a wide tube connected at a standard taper joint to a Dry Ice condenser, for operation of the reaction under reflux of liquid ammonia. One end neck of one of the round bottom flasks was then fitted with a connection to a liquid ammonia supply, and one end neck of the other flask fitted with an inlet for nitrogen. A transfer tube connected the central necks of the flasks, completing the system. The flasks were immersed in temperature-controlled baths, equipped for heating or cooling.

The sodium dispersion employed was a 26.9% sodium dispersion in Sinclair's Light Alkylate, the sodium having been reduced in a Gaulin mill to an average particle size of about 1 to 2 microns. This was prepared as follows: 1560 grams (2250 cc.) of Sinclair's Light Alkylate was placed in the charging pot of a Gaulin mill along with 10 grams of aluminum distearate. The sodium charging port was then opened, and a one pound stick of sodium inserted, after which the port was closed. Nitrogen purging was continued, to ensure a nitrogen atmosphere during the dispersion step. An oil circulation pump was then turned on, and the temperature of the mill brought to 110° C. After heating for fifteen minutes, the sodium had liquefied, and the Gaulin mill was then started, feeding the suspension in slowly, so that the temperature of the circulating solvent was maintained at at least 100° C., and nitrogen pressure was adjusted to 20 p.s.i. The mill was operated for a total time of fifteen minutes, after which time the sodium had been reduced to a particle size distribution ranging from $<0.5$ to $5\mu$ in diameter. The dispersion was then cooled, and removed under nitrogen.

The procedure for the reduction of benzene is as follows: 1.5 liters of anhydrous liquid ammonia was run into the first round bottom flask, the system was filled and blanketed with nitrogen. The ammonia was contained in the system with the Dry Ice condenser. Then, by application of nitrogen pressure, the ammonia was transferred into the second round bottom flask via the transfer tube. Next, there was added to the second flask 1028 grams of the sodium dispersion, containing 276 grams of sodium in 752 grams of the Sinclair's Light Alkylate.

A mixture of 390 grams of benzene (5 moles) and 385 grams (12 moles) of methanol was then prepared, and this was then added slowly to the liquid ammonia solution, which reached reflux temperature, $-33°$ C., over a period of one-half hour. The reaction mixture was then stirred for one hour at reflux temperature to complete the hydrogenation.

In order to destroy excess sodium, methanol was then added at a rate of 5 to 10 ml. per minute, until the reaction mixture turned white. About 100 grams of methanol was used. The reflux return was then shifted to the first reaction vessel, and ammonia vaporized from the second reaction vessel, the Sinclair's Light Alkylate from the dispersion serving as a heat conduction medium and picking up the dihydrobenzene reaction product. The second reaction vessel then was separated from the ammonia condenser, and a water condenser substituted. Water was added to dissolve the sodium methoxide formed and the alkaline layer separated from the product containing organic layer. The organic layer was washed twice with water, and separted, and then dried over magnesium sulfate thereafter, the dihydrobenzene can be flashed out, and the Sinclair's Light Alkylate recovered for reuse or the solution can be used directly. The following results were obtained:

TABLE

| Ex. No. | Raw Materials | | | | Product | |
|---|---|---|---|---|---|---|
| | Na, grams | $C_6H_6$, grams | CH$_3$OH grams a | CH$_3$OH grams b | Crude, grams c | Yield DHB, percent |
| 1 | 276 | 390 | 385 | 116 | 371 | 88.2 |
| 2 | 275 | 390 | 385 | 73 | 417 | 95.0 |
| 3 | 276 | 390 | 385 | 75 | 371 | 75.3 |
| 4 | 276 | 390 | 385 | 56 | 388 | 80.5 |
| 5 | 282 | 390 | 385 | 100 | 2,257.5 | 77.8 |
| 6 | 282 | 390 | 385 | 100 | 2,299 | 86.6 | a Employed in reaction.
b Employed to destroy excess Na.
c In hexane and benzene, B.P. 72-90° C.

The crude dihydrobenzene product had the following analysis:

TABLE II.—ANALYSIS

| | 1,2-DHB, percent | 1,4-DHB, percent |
|---|---|---|
| Example No.: | | |
| 1 | 1.40 | 96.4 |
| 2 | 1.15 | 88.4 |
| 3 | 1.26 | 86.6 |
| 4 | 0.91 | 80.3 |
| 5 | 1.35 | 88.4 |
| | 0.30 | 13.8 |
| 6 | 0.30 | 15.1 |
| Average percent | 0.88 | 63.4 |

It is apparent that excellent yields of 1,4-dihydrobenzene are obtained, using this process.

EXAMPLES 7 to 10

Using the procedure of Examples 1 to 6, a dispersion of sodium of a particle size of from 1 to 2 microns was prepared in Isopar E as the inert diluent, in a Gaulin mill.

This was then used to hydrogenate benzene as in Examples 1 to 6. The following results were obtained:

TABLE III

| Ex. No. | Na grams | Na moles | $C_6H_6$ grams | $C_6H_6$ moles | Methanol grams | Methanol moles | Crude Product (Distillation Fraction), grams |
|---|---|---|---|---|---|---|---|
| 7 | 276 | 12 | 390 | 5 | 385 | 12 | 239 65 202 |
| 8 | 277 | 12 | 390 | 5 | 385 | 12 | ⎫ |
| 9 | 277 | 12 | 390 | 5 | 385 | 12 | ⎬ ¹710 |
| 10 | 277 | 12 | 390 | 5 | 385 | 12 | ⎭ |

¹ 8, 9 and 10 combined.

The crude product had the following analysis:

TABLE IV.—ANALYSIS

| Example No.: | 1,2-DHB, percent | 1,4-DHB, percent | percent Yield 1,4-DHB |
|---|---|---|---|
| 7 | 1.2 / 2.5 / 0.0 | 85.2 / 44.2 / 1.0 | 58.0 |
| 8 / 9 / 10 | ¹2.3 | ¹85.4 | 57.4 |

¹ 8, 9 and 10 combined.

EXAMPLE 11

The solvent-containing dihydrobenzene reaction product of Example 1 was employed in the preparation of an alfin polymer.

The alfin catalyst used in the polymerization was prepared as follows:

Sinclair's Light Alkylate (465 parts) was charged to a 3-necked flask provided with a stirrer, inert gas sweep, and Dry Ice reflux condenser system. To this was added 13.8 parts of finely-divided sodium (0.6 gm. atom, average particle size of about 1 to 2 microns) dispersed in Sinclair's Light Alkylate. To the stirred slurry of sodium particles there was added dropwise 12.1 parts (0.2 mole) of dry isopropanol over a period of 15 minutes during which time the temperature rose to about 40° C. After stirring for one hour 18.9 parts (0.2 mole) of n-butyl chloride was added over a period of one hour during which time the temperature rose to about 50° C. Stirring was then maintained for an additional hour. Excess dry propylene (C. P. grade) was subsequently introduced into the mixture, the temperature of which was permitted to fall to 20° C. by means of an active reflux of liquefied propylene. The preparation was permitted to stand for eight hours with a propylene reflux before venting to remove excess propylene. The reactive slurry was transferred to a storage vessel and maintained under an atmosphere of inert gas. This alfin catalyst preparation (800 ml.) contains equimolar quantities of sodium isopropoxide, sodium chloride and sodium allyl. The preparation contains the equivalent of 0.00075 mole of total sodium compounds per milliliter or 0.00025 mole of the active sodium allyl.

To 105 parts of dry Sinclair's Light Alkylate was added 2.4 parts of 1,4-dihydrobenzene dissolved in 0.6 part Sinclair's Light Alkylate prepared in accordance with the procedure of Example 1. Dry 1,3-butadiene (30 parts) was then dissolved in the Sinclair's Light Alkylate at about −10° C. Alfin catalyst (6 ml.) prepared as described above was added to the butadiene Sinclair's Light Alkylate solution; the system was sealed and maintained at room temperature with intermittent shaking for about two hours. The system was then opened, and ethanol was added to destroy the catalyst and to precipitate the product. The Sinclair's Light Alkylate was separated from the product by steam distilling at about 60° C., purified and recycled for reuse.

The product was then washed intermittently with ethanol and water containing antioxidant to remove soluble inorganic residues( such as sodium isopropoxide and sodium chloride). The resulting insoluble materail, 25.8 g., obtained in an approximately 85% yield, was a white solid polybutadiene. It was given a final wash with acetone containing an antioxidant, N-phenyl-2-naphthylamine, and then dried in an oven at 40° C. under vacuum. The polybutadiene had an intrinsic viscosity of about 2.5.

Having regard to the foregoing disclosure, the following is claimed as the inventive and patentable embodiments thereof:

1. In the process for the hydrogenation of aromatic hydrocarbons having a benzene nucleus in liquid ammonia using metallic sodium and a lower aliphatic alcohol as the source of hydrogen wherein, upon completion of the reaction, the ammonia is distilled off, water is added to the reaction mixture, and the resultant aqueous layer is separated from the organic layer, the improvement which comprises employing sodium which has been dispersed, at a temperature above the melting point of sodium, in a liquid inert diluent selected from the group consisting of aliphatic hydrocarbons and cycloaliphatic hydrocarbons and then milled to an average particle size within the range from about 0.5 to about 50 microns.

2. A process in accordance with claim 1, in which the sodium has an average particle size within the range from about 1 to about 10 microns.

3. A process in accordance with claim 1, in which the inert diluent is a saturated aliphatic hydrocarbon.

4. A process in accordance with claim 1, in which the aliphatic alcohol employed as the source of hydrogen is isopropanol.

5. A process in accordance with claim 1, in which the aromatic hydrocarbon is benzene.

6. A process in accordance with claim 1, in which the aromatic hydrocarbon is an alkyl benzene.

7. A process in accordance with claim 1, wherein the hydrogenation is carried out at a temperature within the range of from about −80 to about −33° C.

References Cited

UNITED STATES PATENTS

| 2,182,242 | 5/1938 | Wooster | 260—667 |
| 2,432,843 | 6/1946 | Whitman | 260—667 |
| 3,274,272 | 9/1966 | Amagasa et al. | 260—666 |
| 3,321,539 | 5/1967 | Slaugh | 260—666 |

JOSEPH L. SCHOFER, Primary Examiner

W. F. HAMROCK, Assistant Examiner

U.S. Cl. X.R.

260—96, 94.7, 94.2